United States Patent Office 3,660,516
Patented May 2, 1972

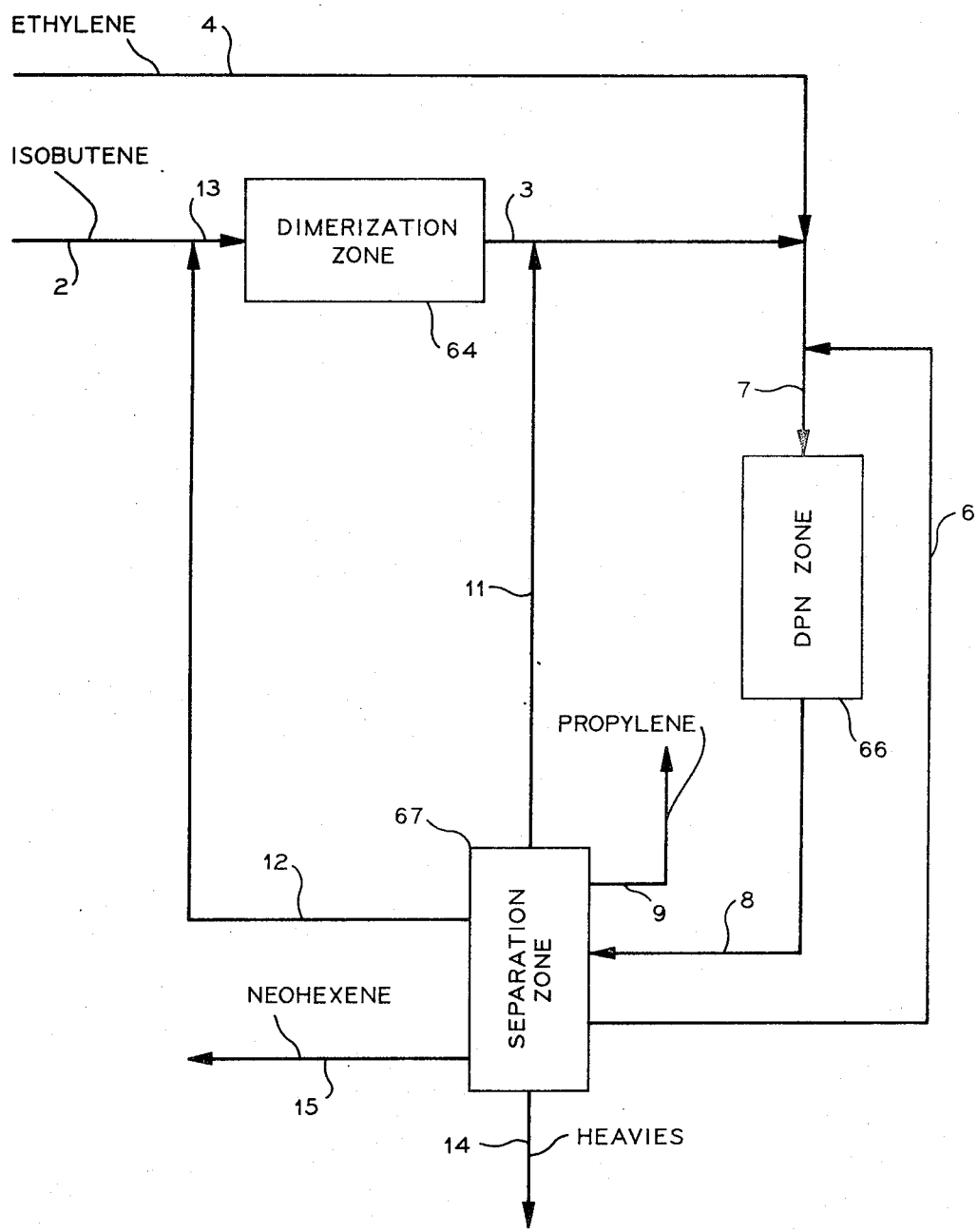

3,660,516
NEOHEXENE FROM ISOBUTENE AND ETHYLENE
Donald L. Crain and Robert E. Reusser, Bartlesville, Okla., assignors to Phillips Petroleum Company
Filed Apr. 15, 1970, Ser. No. 28,661
Int. Cl. C07c 3/62
U.S. Cl. 260—683 D                6 Claims

ABSTRACT OF THE DISCLOSURE

Neohexene is prepared from isobutene and ethylene by dimerizing the isobutene to diisobutylene and subjecting the diisobutylene to ethylene cleavage by way of an olefin disproportionation reaction.

BACKGROUND OF THE INVENTION

Field of the invention

This invention relates to the preparation of neohexene. In a further aspect, the invention relates to a process of preparing neohexene utilizing isobutene and ethylene. In a still further aspect, the invention relates to a process of preparing neohexene using dimerization and olefin disproportionation steps.

Description of the prior art

The reaction of olefinic materials to produce other olefinic materials wherein the reaction can be visualized as the breaking of two existing double bonds between first and second carbon atoms and between third and fourth carbon atoms, respectively, and the formation of two new double bonds, such as between the first and third carbon atoms and the second and fourth carbon atoms, respectively, and wherein the two existing double bonds can be in the same or different molecules, has been called "the olefin reaction." The breaking and formation of these bonds can be visualized by using a mechanistic scheme involving a cyclobutane intermediate. Thus, two unsaturated pairs of carbon atoms combine to form a 4-center (cyclobutane) intermediate which then dissociates by breaking either set of opposing bonds. This reaction can be illustrated by the following formulas:

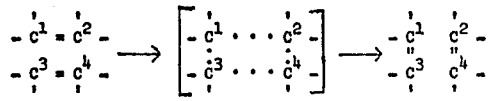

Other terms have been utilized to describe reactions of olefinic materials which are within the scope of the olefin reaction as defined above. These include such terms as "olefin disproportionation," "olefin dismutation," "transalkylidenation," and olefin metathesis." Throughout this specification and claims, the term olefin disproportionation" is used as a matter of choice, and is deemed to be equivalent to the above-mentioned terms, including "the olefin reaction" terminology. Numerous catalyst systems have been reported which effect this reaction, including the catalysts of U.S. 3,261,879, Banks (1966), and U.S. 3,365,513, Heckelsberg (1968).

Included among the reactions which fall within the scope of the term "olefin disproportionation," there is a reaction which employs an internal olefin as one reactant and ethylene as the other. That is, the carbon atoms connected by the double bond of ethylene are one of the pairs of carbon atoms which combine to form the 4-center (cyclobutane) intermediate with another pair of carbon atoms connected by a double bond on a different molecule. For example, ethylene and pentene-2 in the presence of an olefin disproportionation catalyst react to form butene-1 and propylene. Because of the fact that the larger molecule (pentene-2) has been broken to form the shorter molecules (butene-1 and propylene), this type of olefin disproportionation reaction has been called "ethylene cleavage." Another term which has been applied to this type of olefin reaction is "etheneolysis."

Neohexene, also known as 3,3-dimethylbutene-1, is a chemical which exhibits many unique properties. It has been used, as a comonomer, to modify polymers such as polyethylene. The branched configuration with a terminal position of the double bond provides a useful intermediate for many chemical reactions because the double bond cannot migrate from the terminal position. Accordingly, neohexene is capable of undergoing the oxoreaction to form 4,4-dimethyl-1-pentanol, a compound which has been of interest in the manufacture of plasticizers. Neohexene can also be epoxidized and then polymerized. Neohexene can be pyrolyzed to isoprene according to U.S. 3,115,531, Colten et al. (1963). Further interests in the chemical for various uses is continuing. However, commercial utilization of this chemical has been limited by the fact that it is relatively difficult to prepare and accordingly, its cost has been prohibitively high. Prior art processes, typified by that of U.S. 2,417,872, Hill et al. (1942), produce neohexene with low selectivities and low yields.

OBJECTS OF THE INVENTION

It is an object of this invention to prepare neohexene. It is a further object of this invention to prepare neohexene from isobutene and ethylene in relatively high yields. Other objects and advantages of the invention will be apparent from a careful reading of the following disclosure and the appended claims.

SUMMARY OF THE INVENTION

We have discovered a method of preparing neohexene from isobutene and ethylene wherein isobutene is dimerized over a suitable catalyst to diisobutylene. The diisobutylene is then passed to an olefin disproportionation zone wherein it is subjected to ethylene cleavage. This step produces the desired neohexene and substantial quantities of the starting material isobutene. The isobutene can be conveniently recycled to the dimerization step, thereby resulting in high ultimate yields of the desired neohexene product.

BRIEF DESCRIPTION OF THE DRAWING

The sole figure of the drawing presents a simplified schematic flow diagram of the process of the invention illustrating the preparation of neohexene from isobutene and ethylene.

DETAILED DESCRIPTION OF THE INVENTION

The invention can best be understood by reference to the figure of the drawing. Isobutene in line 2 is admixed with recycle isobutene from line 12 in line 13 and introduced into dimerization zone 64. Therein, contact with a suitable dimerization catalyst produces substantial quantities of diisobutylene. The effluent from the dimerization zone 64 is passed via line 3 and is admixed with ethylene from line 4 within line 7 prior to introduction into olefin disproportionation (DPN) zone 66. In some instances, it can be desirable to subject the branched olefin effluent stream from the dimerization zone to a de-oiling step (not shown) prior to introduction into the catalytic olefin disproportionation zone.

Within olefin disproportionation zone 66, the ethylene cleavage of diisobutylene produces neohexene and isobutene as the primary products of the reaction. Smaller amounts of propylene and heavier material are also produced and this effluent is withdrawn from zone 66 via line 8 and passed into separation zone 67. Within zone 67, separation of the zone 66 effluent provides an ethylene recycle stream 11 which is passed to line 3. Propylene is removed from the separation area via line 9. Isobutene produced in zone 66 is removed from the separation zone 67 via line 12 and recycled to dimerization zone 64. Olefins such as unreacted diisobutylene, heavy oligomers, isoamylenes, 2,3-dimethylbutenes, and the like are recycled to the ethylene cleavage unit via line 6 and line 7. Neohexene product is removed from the separation zone 67 via line 15. Any undesirable heavy materials can be removed via line 14.

The drawing of the invention illustrates a simplified and generalized outline of the process of the present invention. For simplicity, conventional items such as pumps, heat exchangers, valves and the like have been omitted. The indicated separation zone will, in actual reality, probably consist of a number of conventional separation units such as fractionating columns or the like.

Some of the principal chemical reactions which are believed to take place in this sequence of steps are as follows:

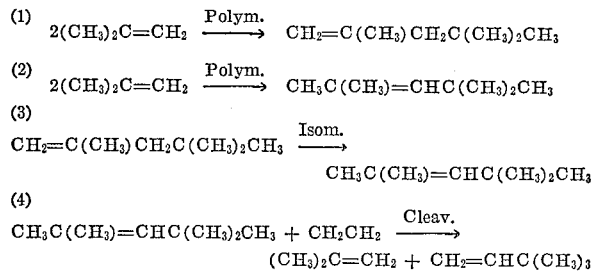

Thus, reactions (1) and (2) represent the formation of diisobutylenes. Reaction (4) shows the ethylene cleavage of the internally olefinic diisobutylene to the neohexene product and the recycleable isobutene by-product. Reaction (3) shows the in situ isomerization which occurs to convert the non-cleavable terminally olefinic diisobutylene to the ethylene cleavable internally olefinic isomer. In analogous reactions, other olefinic molecules are ultimately cleaved to either neohexene, isobutene, or to propylene where there happens to be no branching present in a molecule. Thus, by-products which must be rejected from the process are few. The larger olefins are converted either to the product or the recycleable isobutene feed.

The isobutene dimerization step can employ any suitable catalyst which is capable of dimerizing isobutene. The preferred dimerization catalyst is one which will produce relatively high quantities of diisobutylene (2,4,4-trimethylpentene-1 and 2,4,4-trimethylpentene-2) with relatively small amounts of other $C_8$ isomers or higher isobutene oligomers. Some examples of suitable dimerization catalysts are cold sulfuric acid; phosphoric acid on Kieselguhr; silica/alumina sometimes promoted with Ni, Co, Fe, Pt or Pd; activated natural clays plus activating substances such as ZnO; metallic phosphates such as those of iron (III) and cerium optionally supported on carriers such as activated carbon; bauxite; activated carbon alone and with metal halides such as $TiCl_3$; heteropolyacids such as silicotungstic acid on silica gel and phosphomolybdic acid; $BF_3 \cdot H_3PO_4$ and $BF_3 \cdot HPO_3$; dihydroxyfluoboric acid; HF and fluorides or oxyfluorides of S, Se, N, P, Mo, Te, W, V and Si boiling below 300° C.; $BF_3$-diethyl ether complexes; $BF_3$-hydrocarbon complexes; $BF_3$-$SO_2$; and $AlCl_3$ with cocatalysts such as diethyl ether, HCl, and nitromethane. These catalysts and dimerization processes, including operating conditions, are known in the art. The presently preferred catalyst is cold sulfuric acid.

The dimerization of isobutene will generally result in the formation of some isobutene trimers and other higher molecular weight oligomers. Although it is not required in the process of the invention, the unconverted isobutene and isobutene trimers and other higher oligomers can be separated from the diisobutylenes prior to subjecting the diisobutylenes to the olefin disproportionation step. In addition, a de-oiling step can be performed on the entire dimerization effluent if desired. Preferably, however, the entire effluent of the dimerization is passed directly to the olefin disproportionation zone.

In the olefin disproportionation step of the invention, the effluent from the dimerization zone is mixed with ethylene and contacted with any suitable olefin disproportionation catalyst. Suitable olefin disproportionation catalysts for use in the process of the present invention are any of the catalysts which have ability for converting propylene to ethylene and butene. These catalysts are sometimes referred to as "olefin reaction" catalysts. These catalysts are now well known in the art. The method of preparation and the use of these olefin disproportionation catalysts are known in the art. Solid olefin disproportionation catalysts are presently preferred. Some examples of the preferred catalyst systems are molybdenum oxide on alumina, tungsten oxide on silica or alumina, and rhenium oxide on alumina.

In the process of this invention, the olefin disproportionation catalyst is utilized in conjunction with a suitable double bond isomerization catalyst. The presence of the olefin isomerization catalyst, intimately mixed with the olefin disproportionation catalyst, increases the per pass conversion of the diisobutylene to the desired neohexene product and recycleable by-products. Any double bond isomerization catalyst which is compatible with the olefin disproportionation catalyst of choice may be utilized. The presently preferred catalyst combination is a fixed catalyst bed which comprises an intimate mixture of a particulate activated MgO double bond isomerization catalyst and a particulate activated $WO_3/SiO_2$ olefin disproportionation catalyst. Other suitable catalyst combinations are disclosed in copending application Ser. No. 678,499, Banks and Kenton, filed Oct. 27, 1967, now abandoned in favor of copending continuation application Ser. No. 6,045, filed Jan. 26, 1970. The preparation, activation, and use of these catalyst combinations is illustrated in the above-mentioned applications.

Because of the wide variety of catalysts which are available for use in the disproportionation step of the invention, the temperature, pressures flow rates, ratios, of catalysts to feed materials, and other operating conditions will vary over a wide range. The optimum temperature, pressure and contact times for the particular catalysts employed, and the distribution of disproportionation products desired will all effect the operating conditions to be used in the reaction zones and subsequent separation operations. Therefore, the particular conditions employed can be easily selected by one skilled in the art.

Generally, the proportion of ethylene to branched olefins in the feed to the ethylene cleavage unit will generally range from about 3:1 to about 10:1, although still higher portions of ethylene can be used, if desired. The operating conditions of the ethylene cleavage unit will be such as to result in high conversions of the branched olefin feed material to increase the yield of neohexene per pass and to reduce the amount of recycle necessary.

In the process of the present invention, the principal products of the ethylene cleavage reaction, namely neohexene and isobutene, are fundamental in that they will cleave no further with respect to the olefin disproportionation reaction. Therefore, the contact time and the reaction conditions can be relatively severe without significant danger of loss due to decomposition of either of these two materials.

Depending on the specific disproportionation catalyst, double bond isomerization catalysts, and dimerization catalysts chosen to carry out the steps of the invention, any suitable reaction technique can be utilized, such as fixed bed reactions, fluidized bed reaction, liquid phase batch or continuous operations, and the like. Conventional methods can be used to separate the materials present in the reaction effluents, including fractionation, crystallization, adsorption, and the like. Fractionation is generally preferred.

Since the effluent from the dimerization zone need not be subjected to separation prior to ethylene cleavage, it is within the scope of the invention to perform the dimerization and ethylene cleavage within a single reactor where the dimerization catalyst and the ethylene cleavage catalyst are compatible. For example, it is posible to use tungsten oxide on silica in admixture with magnesium oxide as the olefin disproportionation catalyst and to utilize silica/alumina as the dimerization catalyst. Utilizing a fixed bed operation, it is possible to place the dimerization catalyst bed upstream of the ethylene cleavage catalyst bed and provide an ethylene input between the two beds.

The invention can be further understood by reference to the following illustrative example. The data of the example is for the purpose of illustration of the invention, and should not be construed as limiting the invention described heretofore.

ILLUSTRATIVE EXAMPLE

Neohexene is prepared from isobutene and ethylene by a process as depicted in the sole figure of the drawing. Dimerization unit 64 utilizes a catalyst comprising cold sulfuric acid (65 percent). The unit is operated at a temperature of 75–200° F., at a pressure of 500 p.s.i.g. Residence time within the reactor is about one minute. The ethylene cleavage unit utilizes an intimate admixture of $WO_3/SiO_2$, and magnesium oxide. The ratio of magnesium oxide to tungsten oxide on silica is 4:1 by weight. Operating conditions within zone 66 include a temperature of 700° F., a pressure of 400 p.s.i.g., and a weight hourly space velocity of 25–50. The ratio of ethylene to isobutylene in the ethylene cleavage unit is maintained between 2:1 and 4:1. The composition of the streams as depicted within the sole figure of the drawing are summarized in Table I.

TABLE I

| Material lbs./hr.: | Stream Number | | | | | | | | | | | |
|---|---|---|---|---|---|---|---|---|---|---|---|---|
| | 13 | 3 | 4 | 6 | 7 | 8 | 9 | 11 | 12 | 2 | 14 | 15 |
| Ethylene | | | 5.80 | | 68.60 | 62.80 | | 62.80 | | | | |
| Propylene | | | | | | 1.80 | 1.80 | | | | | |
| Isobutene | 26.10 | | | | | 11.60 | | | 11.60 | 14.50 | | |
| Pentenes | | | | 0.80 | 0.80 | 0.80 | | | | | | |
| Neohexene | | | | | | 17.40 | | | | | | 17.40 |
| Hexenes | | | | 1.50 | 1.50 | 1.50 | | | | | | |
| Diisobutylene | | 23.20 | | 3.00 | 26.2 | 3.00 | | | | | 1.10 | |
| Heavies | | 2.90 | | | | 1.10 | | | | | | |

The above table illustrates that the process of the invention is capable of producing neohexene in a straightforward process with high ultimate yields. The ultimate yield, in mole percent, of neohexene based on isobutene is 80% in this example.

Reasonable variation and modifications of our invention is possible without departing from the spirit and scope thereof.

We claim:
1. A process of preparing neohexene from isobutene and ethylene which comprises
    (a) dimerizing isobutene to provide a stream containing 2,4,4-trimethylpentene-1 and 2,4,4-trimethylpentene-2;
    (b) passing ethylene and the 2,4,4-trimethylpentene-1 and 2,4,4-trimethylpentene-2 formed in step (a) into a catalytic reaction zone containing a solid olefin disproportionation catalyst and a double bond isomerization catalyst to simultaneously isomerize 2,4,4-trimethylpentene-1 to 2,4,4-trimethylpentene-2 and to convert 2,4,4-trimethylpentene-2 and ethylene to neohexene and isobutene;
    (c) removing from the reaction zone a stream comprising neohexene and isobutene;
    (d) separating the stream of step (c) to provide product neohexene and a stream comprising isobutene which is returned as feed to step (a).

2. The process of claim 1 wherein the stream of step (c) removed from the reaction zone also contains 2,4,4-trimethylpentene - 1,2,4,4 - trimethylpentene-2, ethylene, propylene and olefins having a heavier molecular weight than neohexene; and in step (d) the ethylene and 2,4,4-trimethylpentene-1 and 2,4,4-trimethylpentene-2 are returned to step (b), the propylene and olefins of heavier molecular weight are removed from the process.

3. The process of claim 2 wherein step (a) also produces additional quantities of branched olefins and higher molecular weight oligomers which are separated from said diisobutylene prior to step (b).

4. The process of claim 1 wherein step (a) and step (b) are each accomplished in separate reaction zones.

5. The process of claim 1 wherein step (a) and step (b) are accomplished in the same reaction zone.

6. The process of claim 1 wherein the solid olefin disproportionation catalyst is tungsten oxide on silica and the double bond isomerization catalyst is magnesium oxide.

References Cited

UNITED STATES PATENTS 3,526,676   9/1970   Turner et al. _____ 260—683
3,202,725   8/1965   Lorz et al. _____ 260—683.15
3,457,320   7/1969   Stapp et al. _____ 260—683

DELBERT E. GANTZ, Primary Examiner

C. E. SPRESSER, Jr., Assistant Examiner

U.S. Cl. X.R.

260—683.15 A